July 13, 1965   D. J. ALBERT   3,194,717
LAMINATED TAPE STRUCTURE
Filed Nov. 24, 1961   2 Sheets-Sheet 1
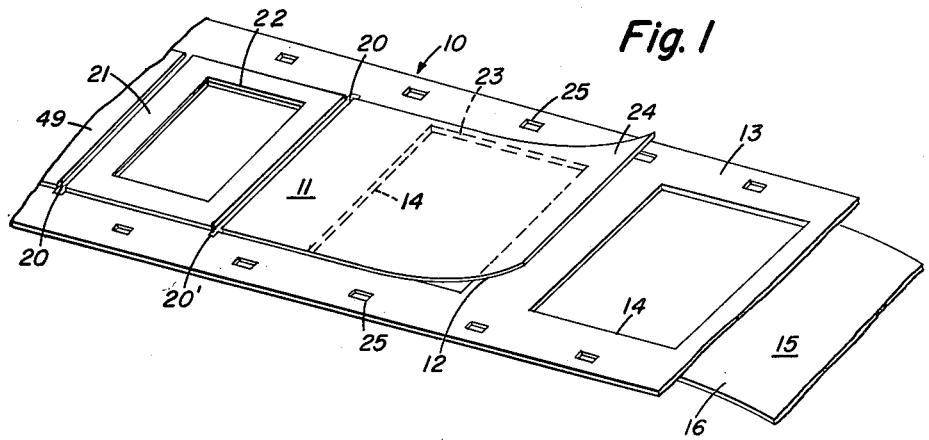
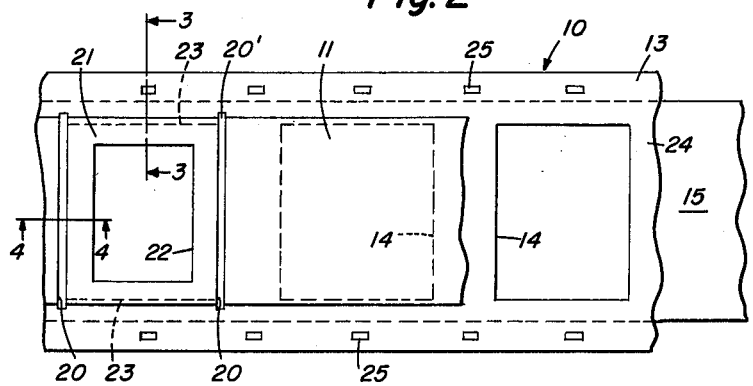
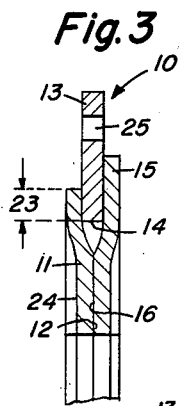
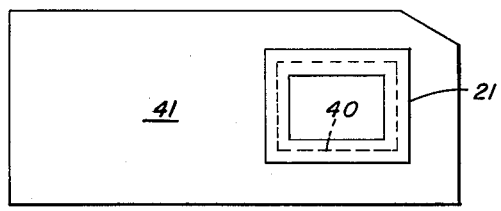
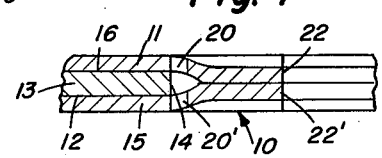
DONALD J. ALBERT
INVENTOR.
BY
ATTORNEY & AGENT July 13, 1965  D. J. ALBERT  3,194,717
LAMINATED TAPE STRUCTURE
Filed Nov. 24, 1961  2 Sheets-Sheet 2

DONALD J. ALBERT
INVENTOR.

BY R. Frank Smith
Lloyd F. Seebach
ATTORNEY & AGENT 3,194,717
LAMINATED TAPE STRUCTURE
Donald J. Albert, Rochester, N.Y., assignor to Eastman Kodak Company, Rochester, N.Y., a corporation of New Jersey
Filed Nov. 24, 1961, Ser. No. 154,449
9 Claims. (Cl. 161—113)

The invention relates to a laminated tape structure and more particularly to a laminated tape structure for carrying and supporting individual sheets or frames of a pressure-sensitive adhesive material which can be removed from a carrier strip of material without the need for a cutting operation.

In the prior art, the cutting and transporting of sheets or frames of a pressure-sensitive adhesive material presents a problem in that such sheets or frames are exceptionally thin and, if unsupported, other means must be provided to ensure that the material does not buckle or deform in the cutting station. In the application of sheets or frames of pressure-sensitive material to record cards, as disclosed in U.S. Patent 2,588,087, the frames of pressure-sensitive material are conveyed in close proximity to the cutting station by a carrier tape which is peeled from the adhesive material just prior to entry of a sheet or frame into the cutting station. From the point at which the carrier tape is removed to the point at which the frame or sheet is positioned under the cutting knife, no support is provided for the frame or sheet and due to the fact that it is very thin, it is difficult to locate the material for accurate cutting and application with respect to the aperture in the card.

These disadvantages of the prior art are overcome by the present invention in that the disclosed laminated tape structure provides a definite and relatively stiff support for the sheet or frame as it is moved into a station for application to an article. The sheets or frames are formed at the time the laminated tape is being made and each sheet or frame is supported along two edges over an aperture in the carrier tape by opposite marginal edges of the carrier tape at the aperture, the sheets or frames and apertures in the carrier tape being arranged longitudinally of the carrier tape. After the protective tape has been peeled from the laminated tape, the carrier tape continues to support the sheet or frame as it is moved into a position for application to the article. Due to the manner in which the sheet or frame is supported on the carrier tape, a reciprocating plunger or anvil can be merely moved against the sheet or frame to move it through the aperture and against the article to which it is to be applied, there being no need for cutting any part of the sheet or frame at the time of application.

The laminated tape structure disclosed and described in detail hereinafter comprises a first tape or strip of material having a pressure-sensitive adhesive material applied to one surface thereof. A second tape or strip of material having apertures of a predetermined size, for example, rectangular apertures which are spaced longitudinally of the second tape, is arranged with one surface contiguous to the adhesive material on the first tape. A third tape or strip of material having an adhesive resistant material on at least one surface thereof is arranged with the adhesive resistant material contiguous to the other surface of the second tape. After this laminated tape structure has been formed, the first tape is then slit in a transverse direction within and adjacent each transverse edge of each aperture in the second tape to form individual sheets. The width of each aperture in the second tape is less than the width of the first tape so as to provide narrow ledges at opposite sides of each aperture which support the sheet formed by the slitting operation. At the same time that the first tape is slit, a central opening can be formed to provide a frame of material rather than a sheet. A sheet or frame so formed can be easily removed from the second tape by moving it directly through the aperture over which it is suspended, the adhesive surface, in effect, being slid off the supporting ledges of the second tape.

The primary object of the invention is, therefore, to provide a laminated tape structure in which indiviual sheets or frames of a pressure-sensitive adhesive material are supported on a carrier tape and can be readily removed therefrom.

Another object of the invention is to provide a laminated tape structure in which individual sheets or frames of a pressure-sensitive adhesive material are spaced longitudinally of a carrier tape and supported over apertures in the carrier tape by marginal portions of the carrier tape at opposite sides of each aperture.

Yet another object of the invention is to provide a laminated tape structure in which individual sheets or frames of a pressure-sensitive material are supported over longitudinally spaced apertures in a carrier tape by marginal portions of the carrier tape at opposite sides of each aperture and a cover strip contiguous to the carrier tape and to the adhesive material exposed in each of the apertures in the carrier tape.

And still another object of the invention is to provide a laminated tape structure in which preformed sheets or frames of a pressure-sensitive adhesive material can be readily removed from a carrier tape without cutting either the pressure-sensitive adhesive material or the carrier tape prior to application of a sheet or frame to an article.

Other objects and advantages will be apparent to those skilled in the art by the description which follows.

Reference is now made to the accompanying drawings wherein like reference numerals designate like parts and wherein:

FIG. 1 is a perspective view of the laminated tape structure showing the relation of the tape elements comprising said laminated tape;

FIG. 2 is an elevation view of the tape structure disclosed in FIG. 1 and showing the formation of the individual sheets or frames;

FIG. 3 is a vertical section taken on line 3—3 of FIG. 2;

FIG. 4 is a vertical section taken on line 4—4 of FIG. 2;

FIG. 6 is an elevation view of a record card with a frame of pressure-sensitive adhesive material applied thereto;

Figure 5:
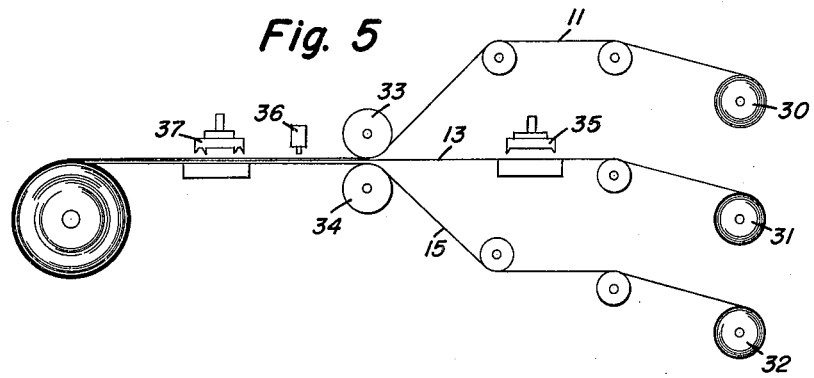
FIG. 5 is a diagrammatic representation of an arrangement by which the laminated tape structure shown in FIGS. 1 and 2 is formed.

With reference particularly to FIGS. 1 and 2 of the drawings, the laminated tape 10 comprises a tape or strip 11 of thin material having a pressure-sensitive adhesive material applied to one surface 12 thereof, a carrier tape or strip 13 which is provided with longitudinally spaced, rectangular apertures 14 and a protective tape or strip 15 having an adhesive resistant agent applied to at least one surface 16 thereof. The tape 11 is preferably a polyester film, such as Mylar, although other transparent or opaque materials, such as paper, can be used, and is of a width slightly larger than the transverse dimension of the apertures 14 for a reason to be set forth hereinafter. Tape 13 is preferably a kraft paper which is wider than tape 11 and is arranged between tapes 11 and 15. The tape 13 must have a sufficiently hard surface so the tape 11 can be readily removed, as described hereinafter, and if necessary can be coated with a material, such as polyethylene. Tape 15 is a glassine paper and can be of the same width as either tape 11 or tape 13 or of an intermediate width, as shown in FIGS. 1 and 2. Tape 15 can be of any other thin material which is coated on at least one surface with an adhesive resistant agent, such a coated surface being contiguous to tape 13.

When tape 11, tape 13 with apertures 14 therein and tape 15 are brought together, the adhesive surface of tape 11 which is exposed within each of apertures 14 is protected by tape 15. At this time, slits 20 are cut into or blanked from tape 11, the slits being made adjacent each of the transverse edges of apertures 14 and of sufficient length to completely sever tape 11 into individual sheets. The ends of the slits can extend into tape 13, as shown in FIGS. 1 and 2 and designated by numeral 20', and can be made in the three tapes if tape 13 is of an intermediate width. If individual frames 21 are to be formed, their central openings 22 and 22' can be cut in tapes 11 and 15 at the same time as slits 20. It is preferably if the width of tape 11 is the same as one dimension of the sheet or frame to eliminate any need for longitudinal cutting of tape 11. As noted above, aperture 14 is not as wide, that is, in a transverse direction with respect to tape 11, as tape 11. As a result, when slits 20 and the openings 22 are cut or blanked in tape 11, each sheet or frame 21 is supported over its respective aperture 14 in tape 13 by the marginal edges thereof which are still adhered to the opposite longitudinal margins 23 of tape 13 adjacent aperture 14. When tape 15 is removed, or if tape 15 is not used, each sheet or frame 21 is still supported over its respective aperture 14 solely at the opposite longitudinal edges by the margins 23 of tape 13. Tape 15 can be omitted if the outer surface 24 of tape 11 is coated with an adhesive resistant agent, in which case tapes 11 and 13 can be wound in roll form without encountering any difficulties upon unwinding due to the adhesive on the other surface of tape 11 which is exposed in apertures 14. In order to facilitate movement of tape 10 and to ensure registry of the sheet or frame 21 with the article to which it is to be applied, tape 13 can be provided along one or both edges with spaced perforations 25.

With reference to FIG. 5, the tapes 11, 13 and 15 are withdrawn from their respective supply rolls 30, 31 and 32 and brought together at the pressure rolls 33 and 34. A reciprocating die 35 is arranged ahead of rolls 33 and 34 and blanks the spaced apertures 14 in tape 13 before it is joined to the other tapes. Perforations 25 in tape 13 can be made at the same time as apertures 14 or by a die 36 arranged beyond rolls 33 and 34, as shown in FIG. 5. After the tapes have been joined, the laminated tape 10 is moved under a reciprocating die 37 which will cut the slits 20 in tapes 11 and 15 and within each of apertures 14 if a sheet of pressure-sensitive adhesive material is required. If a frame is to be formed, the die 37 can be such as to cut slits 20 and openings 22 and 22' in tapes 11 and 15 simultaneously. Since slits 20 and openings 22 and 22' must be accurately located so as to be within and in registry with each of apertures 14, it is desirable to perforate tape 13 before the cutting of slits 20 and openings 22 and 22' takes place in order to utilize the perforations 25 for moving and indexing tape 10 and apertures 14 into proper relation with respect to die 37. The tape 10 can then be wound into roll form, the exposed adhesive surface of tape 11 within each of apertures 14 being covered and protected by tape 15. The adhesive resistant agent on tape 15 which is contiguous to the exposed adhesive surface of tape 11 permits tape 15 to be readily peeled from tape 10, as described hereinafter. As pointed out above, tape 15 can be eliminated if the outer surface 24 of tape 11 is coated with an adhesive resistant agent to permit tapes 11 and 13 to be readily wound into roll form as well as to be readily unwound from a roll form.

Figure 7:
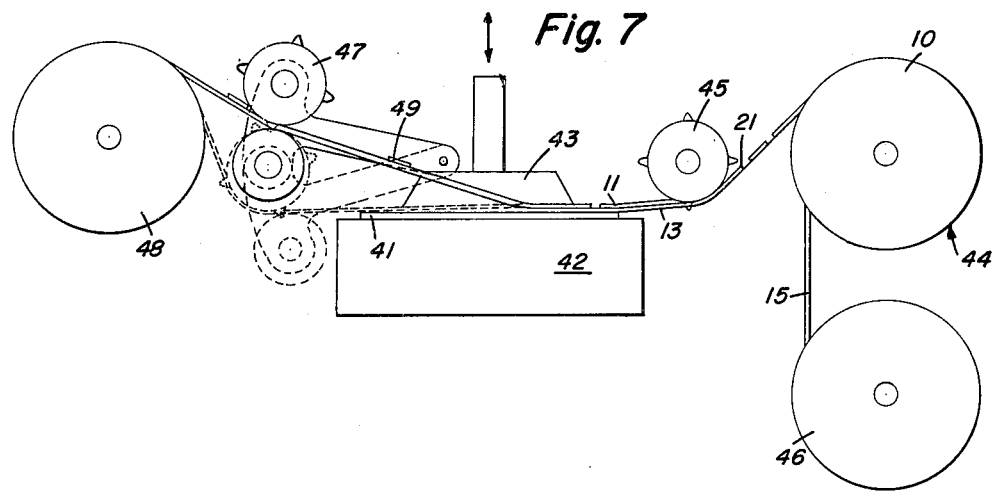
FIG. 7 is a diagrammatic representation of an arrangement for removing a frame of pressure-sensitive adhesive material from the laminated tape structure and applying it to an article, such as a record card.
Figure 8:
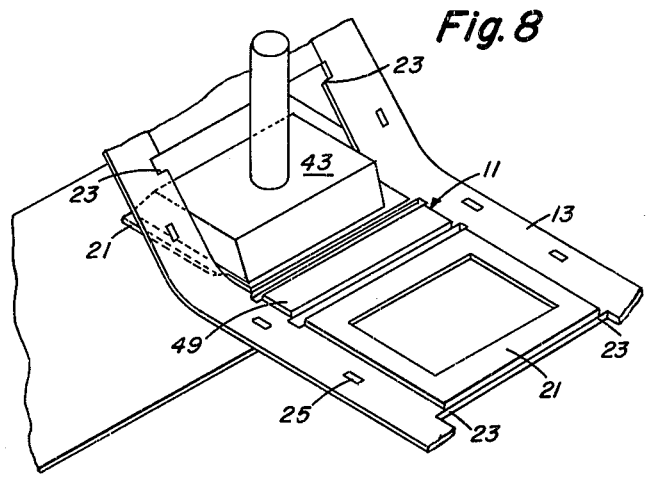
FIG. 8 is a detail perspective view of the anvil shown in FIG. 7 for removing a frame of pressure-sensitive adhesive material from the carrier tape.

If, by way of example, a frame 21 is to be applied in registry with an aperture 40 in a record card 41, as shown in FIG. 6, the card 41 is positioned on a platen or block 42 and in proper relation to a reciprocating anvil 43 arranged over the platen. The tape 10 is withdrawn from supply roll 44 by an intermittently driven sprocket 45 which engages the perforations 25 in tape 13. Tape 15 is peeled from tape 10 and wound onto roll 46, the tapes 11 and 13 being moved beneath anvil 43 by a sprocket 47, as shown in FIG. 7. Sprocket 47 and take-up roll 48 are driven intermittently so as to position each frame 21 of adhesive material in registry with the aperture 40 in the card positioned under anvil 43. After a frame 21 has been positioned over card 41 and tape 10 is stationary, anvil 43 is moved downward and engages the frame 21 to move it through the aperture 14 in tape 13 and into contact with card 41. As shown in FIG. 8 in more detail, anvil 43, together with the inclined position of tape 10, actually peels frame 21 from the supporting margins or ledges 23 of tape 13. In this particular instance, it would be required that a vacuum be applied to anvil 43 to hold the frame until it is brought into actual contact with card 41. On the other hand, the vacuum can be eliminated if tapes 11 and 13 are arranged in close proximity to card 41 and tape 13 is moved upward after anvil 43 has moved the frame into contact with the card. This can be accomplished by mounting sprocket 47 and its pressure roller on a pivotal arm which is moved in a clockwise direction, such action peeling frame 21 from tape 13, as shown in FIG. 8. Tape 13 carries and supports each of frames 21 until actually removed from tape 13, the pieces 49 of tape 11 between each of frames 21 being retained by tape 13 and wound therewith onto take-up roll 48. It will be noted with respect to FIG. 8 that anvil 43 is not as wide as the transverse dimension of aperture 14 in tape 13 and, as a result, the edges by which frame 21 is supported on ledges 23 may not be in intimate contact with card 41. This condition can be remedied by moving card 41 between a set of pressure rolls, not shown, after it has been removed from beneath anvil 43.

It will be readily appreciated by those skilled in the art that frame 21 can be of other regular shapes and still be supported by tape 13 in the manner disclosed. Since other changes and modifications can be made in the tape structure as well as different materials for each of the tapes, the invention is not to be limited to the embodiment described and disclosed herein but is of a scope as defined by the appended claims.

Having now particularly described my invention, what I desire to secure by Letters Patent of the United States and what I claim is:

1. A laminated tape structure, for supporting a plurality of removable areas formed in one of the tape lamina comprising a first tape having an adhesive on one surface thereof and having a plurality of spaced transverse slits dividing said tape into a plurality of removable areas spaced longitudinally on said tape; and a second tape contiguous to the adhesive surface of said first tape and provided with a plurality of longitudinally spaced apertures in registry with said areas of said first tape, said apertures being of substantially the same longitudinal dimension as said areas and smaller transversely than said areas, whereby longitudinal marginal portions of said second tape support each of said areas along opposite edges thereof.

2. A laminated tape structure in accordance with claim 1 wherein said first tape is a thin, transparent material having a pressure-sensitive adhesive on one surface thereof and said second tape is a paper of a width greater than said first tape.

3. A laminated tape structure in accordance with claim 1 wherein said transverse slits are of a length at least equal to the width of said first tape.

4. A laminated tape structure for supporting a plurality of removable areas formed in one of the tape lamina comprising a first tape having an adhesive on one surface thereof and a plurality of movable areas spaced longitudinally thereof, each of said areas being defined by a pair of spaced transverse slits, a second tape contiguous to the adhesive surface of said first tape and provided with a plurality of longitudinally spaced apertures in registry with said removable areas of said first tape, said apertures being of the same dimension as said areas in a longitudinal direction and smaller than said areas in a transverse direction for supporting each of said areas along opposite edges thereof, and a third tape having an adhesive resistant agent on at least one surface which is contiguous to said second tape and to the adhesive surface of said first tape exposed in said apertures in said second tape.

5. A laminated tape structure in accordance with claim 4 wherein each of said removable areas defined by said slits is provided with a central opening and said third tape is provided with apertures of the same size and shape as and in registry with said central openings.

6. A laminated tape structure in accordance with claim 4 wherein said second and said third tapes are of a width greater than said first tape and said transverse slits are of a length at least equal to the width of said first tape.

7. A laminated tape structure in accordance with claim 4 wherein said first tape is a thin, transparent material and said adhesive on said one surface thereof is pressure-sensitive.

8. A laminated tape structure in accordance with claim 4 wherein said second tape is a kraft paper.

9. A laminated tape structure in accordance with claim 4 wherein said third tape is a glassine paper.

References Cited by the Examiner
UNITED STATES PATENTS

| | | | |
|---|---|---|---|
| 1,926,553 | 9/33 | Morse | 161—406 |
| 2,552,664 | 5/51 | Burdine | 154—53.5 |

EARL M. BERGERT, *Primary Examiner.*

UNITED STATES PATENT OFFICE
CERTIFICATE OF CORRECTION

Patent No. 3,194,717                          July 13, 1965

Donald J. Albert

It is hereby certified that error appears in the above numbered patent requiring correction and that the said Letters Patent should read as corrected below.

Column 4, line 75, for "movable" read -- removable --.

Signed and sealed this 18th day of January 1966.

(SEAL)
Attest:

ERNEST W. SWIDER                       EDWARD J. BRENNER
Attesting Officer                          Commissioner of Patents